(12) United States Patent
Leibinger

(10) Patent No.: US 10,392,303 B2
(45) Date of Patent: Aug. 27, 2019

(54) CEMENT CLINKER LINE AND A METHOD FOR OPERATING A CEMENT CLINKER LINE

(71) Applicant: Südbayerisches Portland-Zementwerk Gebr. Wiesböck & Co. GmbH, Rohrdorf (DE)

(72) Inventor: Helmut Leibinger, Rohrdorf (DE)

(73) Assignee: SÜDBAYERISCHES PORTLAND-ZEMENTWERK GEBR. WIESBÖCK & CO. GMBH, Rohrdorf (DE)

( * ) Notice: Subject to any disclaimer, the term of this patent is extended or adjusted under 35 U.S.C. 154(b) by 0 days.

(21) Appl. No.: 16/130,908

(22) Filed: Sep. 13, 2018

(65) Prior Publication Data

US 2019/0010089 A1   Jan. 10, 2019

Related U.S. Application Data

(63) Continuation of application No. PCT/EP2017/056426, filed on Mar. 17, 2017.

(30) Foreign Application Priority Data

Mar. 18, 2016 (EP) .................................. 16161106

(51) Int. Cl.
*C04B 2/10* (2006.01)
*C04B 7/44* (2006.01)
(Continued)

(52) U.S. Cl.
CPC .............. *C04B 7/4415* (2013.01); *C04B 7/44* (2013.01); *C04B 7/47* (2013.01); *B01D 53/002* (2013.01);
(Continued)

(58) Field of Classification Search
USPC ................................ 106/638, 713, 739, 740
See application file for complete search history.

(56) References Cited

U.S. PATENT DOCUMENTS

| 4,344,793 A * | 8/1982 | Burkett | C22B 43/00 266/148 |
| 2009/0193968 A1* | 8/2009 | Jepsen | B01D 53/06 95/134 |

(Continued)

FOREIGN PATENT DOCUMENTS

DE   102011052561 B4   11/2012

*Primary Examiner* — James E McDonough
(74) *Attorney, Agent, or Firm* — Yakov S. Sidorin; Quarles & Brady LLP

(57) ABSTRACT

A method for manufacturing clinker including the steps of sintering raw meal in a kiln to clinker, preheating the raw meal in a preheater using a main flue gas stream from the kiln as a heat source, dedusting the main flue gas downstream from the preheater at a temperature below the boiling point of mercury, thereby obtaining mercury-loaded dust and withdrawing a bypass flue gas stream from the kiln. Implementation of the method results in efficient removal of the mercury from the process if mercury in the bypass flue gas is evaporated by injecting at least a fraction of the mercury-loaded dust into the bypass flue gas stream. Subsequently, the bypass flue gas is dedusted and cooled down. The mercury can be adsorbed by injecting an adsorbent like activated charcoal into the bypass flue gas. With the subsequent removal of the adsorbent, mercury is finally removed from the process.

16 Claims, 3 Drawing Sheets

(51) Int. Cl.
*C04B 7/47* (2006.01)
*C04B 7/00* (2006.01)
*C04B 7/34* (2006.01)
*C04B 28/00* (2006.01)
*C04B 32/00* (2006.01)
*C04B 9/12* (2006.01)
*C04B 28/04* (2006.01)
*B01D 53/00* (2006.01)
*B01D 53/64* (2006.01)
*B01D 53/75* (2006.01)

(52) U.S. Cl.
CPC .............. *B01D 53/64* (2013.01); *B01D 53/75* (2013.01); *B01D 2257/602* (2013.01)

(56) References Cited

U.S. PATENT DOCUMENTS

| | | | |
|---|---|---|---|
| 2011/0041690 A1* | 2/2011 | Jepsen | B01D 53/002 95/148 |
| 2015/0086453 A1* | 3/2015 | Gossman | B01D 53/64 423/210 |
| 2016/0133425 A1* | 5/2016 | Donaghey | B03B 9/062 241/24.12 |

* cited by examiner

US 10,392,303 B2

CEMENT CLINKER LINE AND A METHOD FOR OPERATING A CEMENT CLINKER LINE

CROSS-REFERENCE TO RELATED APPLICATIONS

This application is a continuation of the pending International Application No. PCT/EP2017/056426 filed on 17 Mar. 2017, which designates the United States and claims priority from the European Application No. 16161106.6 filed on 18 Mar. 2016. The disclosure of each of the above-identified applications is incorporated herein by reference.

BACKGROUND

1. Field of the Invention

The invention relates to a method for manufacturing cement clinker by sintering raw meal in a kiln to cement clinker (which may be referred to simply as clinker, for short). To this end, raw meal is preheated in a preheater system using a main flue gas stream from the kiln as a heat source. Downstream from the preheater, the flue gas is cooled to a temperature below that of the boiling point of mercury and dedusted, to obtain mercury-loaded dust. The invention also relates to a cement clinker line configured to carry out such process of manufacturing.

2. Description of Relevant Art

Cement clinker is an important intermediate material product created during the production of cement, for concrete. Cement clinker is produced by calcining and sintering so-called raw meal in a kiln. The raw meal is a mixture of some mining products, mainly limestone and clay and/or other alumino-silicate materials. These mining products are, in a first step of the process, dried by applying waste heat transported by kiln exhaust gas, and milled. Subsequently, the so-obtained raw meal is preheated in a so-called preheating tower ('preheater'), again with the use of kiln exhaust gas as a heat source. Often, the preheated raw meal is provided (delivered) to a calciner for (pre-) calcining of the raw meal. The preheated and optionally (pre-) calcined raw meal is then subsequently sintered in a kiln, and discharged to a clinker cooler. The described process is known in related art (an illustrative introduction is provided, for example, by Dr. Harder in "Der Herstellungsprozess", published in ZKG-Handbuch Zementanlagenbau 2013/2014, p. 20 to 37, Bauverlag By, Gütersloh).

The energy consumption of cement clinker lines is remarkable: The theoretical thermal energy for the chemical reactions in clinker manufacturing is 1.8 GJ/t. Including losses 3.3 GJ/t have been reported (Numbers taken from Cement chemistry, H. F. W. Taylor, table 3.3, 2nd ed., Thomas Telford Publishing, London, 1997). Bayer reports a mean thermal energy of 2.9 GJ/t of clinker for German plants in 2012 (ZKG-Handbuch Zementanlagenbau 2013/2014, p. 41). To re-duce manufacturing costs, fuels like coal, gas and the like are substituted by plastic waste and other organic matter. These substitute fuels further augment the amount of heavy metals like mercury in the process that are as well introduced by the mining products. The emission of mercury has been limited by the Minamata-Convention on mercury in 2013 and thus emission limits are reduced.

The vaporization of mercury depends on its origin in the preheater and in the kiln. The same holds true for other heavy metals, depending on their respective boiling temperatures. The mercury vapor becomes part of the flue gas that is transported towards the exhaust. However, emission of mercury via the exhaust has negative impact on the environment and should be avoided. Another part of the mercury condenses on or is adsorbed by the dust of the flue gas and is separated from the flue gas. However, the dust is usually reintroduced to the process (via the preheater) as it mainly includes clinker dust and raw-meal dust. Thus, when heating the dust up, the mercury is vaporized again and when cooling the flue gas down, the mercury condenses again. Accordingly, the mercury concentrates in the manufacturing line.

Inventors of US 2015/0086453 suggested to inject metal sulfide compounds or organic sulfide compounds into the kiln to decompose the compounds and release elementary sulfur, to have the elementary sulfur react with elementary mercury to produce mercury sulfide. Mercury sulfide can then be captured using bag filters or electrostatic precipitators.

In WO 2010/107404, it is suggested to dedust (that is, to remove the dust from) the still hot flue gas downstream from the preheater with the use of an electrostatic precipitator. The dedusted flue gas is subjected to a selective catalytic denitrification and cooled down to about 125° C. by injecting water. Subsequently, an adsorbent is injected to the cooled flue gas stream. The mercury attaches to the adsorbent and is removed from the flue gas by a downstream bag filter prior to releasing the flue gas via an exhaust.

US 2011/0041690 A1 suggested a cement clinker line having a chloride bypass branch to prevent the preheater from clogging. A mercury-loaded dust is provided to the chloride bypass stream, heated, and subsequently removed from the chloride bypass stream.

DE 10 2011 052 561A1 also suggested a cement clinker line having a chloride bypass branch. Here, the bypass flus gas stream is first diluted with ambient air, to thereby cool the bypass stream down below the condensation temperature of alkali chlorides, to condense the alkali chlorides in the bypass stream on the dust particles of the bypass gas stream. The dedusted bypass stream is then provided to a water boiler. The heated water is used in a steam turbine process.

US 2010/041690 A1 suggested reducing mercury emissions of a cement clinker line by removing mercury from a chloride bypass stream. In a first step, the chloride bypass stream is cooled below the condensation temperature of alkali chlorides, which in turn condense on the kiln dust. The mercury remains in the gas phase of the bypass gas stream. The dust is removed with a first hot gas dust collector and, subsequently, mercury containing particulate material is brought in direct contact with the previously dedusted bypass gas stream in a reactor. Accordingly, the particulate matter heats up and the mercury is transformed to the gas phase. The particulate material is thus cleaned from mercury and removed from the bypass gas stream with a second hot gas dust collector. The cleaned particulate matter is subsequently fed to the kiln. The bypass gas stream is now cooled down and an adsorbent is injected into the stream, to cause the attachment of the mercury to the adsorbent. Removal of the adsorbent from the bypass stream by a third dust collector removes the mercury from the clinker line.

DE 10 2011 052 561 A1 suggested using excess heat of bypass gas stream, of a cement clinker line, as a heat source of a steam boiler. Here, as usual, the bypass gas stream is withdrawn from the kiln exhaust and cooled down below the condensation temperature of the alkali chlorides by adding fresh air to the bypass gas stream. The alkali chlorides thus condense on the dust and can be removed from the clinker line by dedusting the bypass gas stream. After dust removal, the bypass gas stream is provided to the steam boiler.

SUMMARY

The problem to be solved by the invention is to reduce mercury emissions and, in at least in part, other heavy metal emissions of a cement clinker line at reduced operating costs.

Solutions to this problem are described in the independent claims. The dependent claims relate to further improvements of the invention.

The idea of the invention stems from the observation that heavy metal emissions (such as, for example, mercury emissions) are low during the ramp up of the process. It thus appears that the mercury has to accumulate in the cement clinker line before it leaves the process via the exhaust. According to the idea of the invention, it is thus sufficient to maintain a low mercury concentration in the cement clinker line to reduce mercury emissions via the exhaust gas. This approach applies accordingly to reduce other heavy metal emissions.

The method for manufacturing clinker includes at least sintering raw meal in a kiln to clinker. As usual, the raw meal is preheated in a raw meal preheater ('preheater') using the flue gas produced in the kiln. After being preheated, the raw meal is provided to the kiln that is configured for calcining and sintering the raw meal to clinker. Of course, a specific implementation of the method may as well include a step of calcining the preheated raw meal at least partially in a calciner, and therefore a part of the flue gas may be optionally produced in the calciner. This aspect of the proposed methodology will not be discussed herein in any substantial detail. For the sake of the simplicity of the presentation, the idea and/or embodiment(s) of the invention are explained without explicit reference to an optional calciner. Thus, the term kiln may be understood to optionally include a calciner. In any case, the preheated raw meal is fed to the kiln that is configured to covert the preheated raw meal into clinker.

The flue gas exiting the preheater is processed as usual and cooled down to a temperature at which mercury and/or mercury compounds condense on the dust particles that are being transported by the main flue gas stream. Similarly, other heavy metals and their compounds condense on the dust particles during such processing of the flue gas.

The cooled (cold) flue gas stream is dedusted by flue-gas-dedusting system downstream from the preheater. Such process produces a mercury-loaded dust, i.e. dust containing metallic mercury and/or mercury compounds. Other heavy metals and/or heavy metals compounds are (or may be) as well attached to the dust. In this disclosure, the term 'mercury loaded dust' is used generally without explicit reference to which particular, other heavy metals and heavy metal compounds may be contained in the dust in addition to or as alternative to mercury, but includes the situation when dust contains heavy metal materials that differ from mercury. The dust includes mainly of clinker dust and raw meal, but mercury and other heavy metals which have been transported with the flue gas stream are adsorbed by the dust particles. Such adsorption is enhanced, if and when the flue gas is cooled below the boiling temperature of mercury. Preferably, the flue gas is cooled down to about 250° C. or even lower to enable dedusting the flue gas using bag filters (which have lower installation and operational costs than electrostatic precipitators). Moreover, the lower the temperature of the flue gas (prior to the dedusting step) the higher the degree to which mercury or other heavy metals attach to the dust and, therefore, the lower the mercury content in the dedusted main flue gas stream.

Dedusting system Cooling of the flue gas stream can be carried out, e.g. by using a heat exchanger that in turn heats another fluid (or raw meal); thus the thermal energy transported with the flue gas can be used as process heat, e.g. for a turbine process. Other possibilities for cooling can be used in related embodiments, e.g. mixing the flue gas with a cold(er) gas, water spray cooling and the like. The flue gas may as well be denitrified, for example as explained in EP 2 545 337. It is not relevant, for implementation of a particular embodiment of the invention, at which particular stage of the process dedusting of the main flue gas takes place (e.g. prior or after the action of denitrification, in one implementation), but at least one dedusting step should take place at a temperature level at which a significant part of the mercury content in the flue gas is attached to or otherwise adsorbed by the dust particles. The dust is thus mercury loaded and its main constituents are raw meal and clinker dust.

At least a fraction of the mercury (and other heavy metals) of the mercury-loaded dust is vaporized in a bypass flue gas stream. In contradistinction with the theoretic definition of 'vaporizing', vaporization of mercury as used here simply means subjecting mercury (or the respective mercury compounds) to a phase transition from solid or fluid to a gaseous state, no matter and with no regard to how this phase transition takes places in detail. In other words, after the vaporization, the present mercury is at least to a large extent in a gaseous state no matter which particular process is used (e.g. sublimation, vaporization, evaporation, boiling . . . ). While the related term 'gasification' can be also used in this situation, such related term is typically used only for converting hydrocarbon fuels to carbon monoxide and could thus be potentially misleading.

Vaporization of the mercury (and other heavy metals) can be carried out by injecting at least a fraction of the mercury-loaded dust into to an auxiliary flue gas stream (which is provided, for example, by branching of a fraction of the main flue gas stream originating from the kiln). The remaining (main) fraction of the main flue gas stream (referred to herein as the main flue gas stream) is processed as usual, and explained above. The auxiliary flue gas stream is preferably branched off, i.e. drawn off, from the main flue gas stream at a location downstream from the preheater, but prior to cooling the main flue gas stream to the temperature below the boiling point of mercury (for example, as discussed above). Alternatively, the auxiliary flue gas stream may be drawn off from an intermediate gas exit of the preheater. The intermediate exit may, e.g. enable to draw off auxiliary gas between two cyclones of the preheater.

Alternatively, the mercury can be vaporized using the heat of the main flue gas stream, as a result of injecting at least a fraction of the mercury-loaded dust into the main flue gas stream at a location upstream from the branch configured for drawing off the auxiliary flue gas stream. For example, such fraction of the mercury-loaded dust can simply be added to the preheater. In the preheater, the mercury heats up, becomes gaseous, and leaves the preheater with the main flue gas stream. The substantial portion of the 'de-mercurized' dust enters the kiln and is processed to clinker.

The reference to injecting a fraction of mercury-loaded dust or matter to a gas stream implies and defines an addition of the fraction of dust to such gas stream. In other words, the fraction (of dust) at issue is disposed in the corresponding duct, e.g. using a mixing chamber, a rotary feeder and/or the like. After injecting, the mercury-loaded raw meal may be transported with the respective gas stream. For example, the dust is thereby heated by the auxiliary flue gas stream, and due to the heating the mercury changes into its gaseous state.

The auxiliary flue gas stream is preferably a fraction (typically 1% to 10% or higher) of the main flue gases stream, which is separated from the main flue gas stream. As indicated above, the auxiliary flue gas stream may for example be drawn off from the preheater, e.g. after the last cyclone. Measurements revealed a remarkably high mercury concentration in the main flue gas stream in the preheater already prior to the last (encountered in the direction of the flow of the flue gas) cyclone Thus, a mercury-loaded flue gas fraction, providing the auxiliary flue gas stream, can be drawn off between the preheater stages. Drawing off the auxiliary flue gas stream prior to the last stage of the preheater provides an accordingly hotter auxiliary flue gas stream. In turn, the flow rate of the auxiliary flue gas—that is required to heat a given amount (per unit of time) of mercury-loaded dust above the vaporization temperature of mercury or the relevant mercury compounds—can be reduced, thereby reducing the installation costs. Further, due to the higher temperatures present in the flow, other heavy metals with higher boiling temperatures can be vaporized from the dust as well and, therefore, separated from the dust.

After vaporizing the mercury (or other heavy metals), contained in the mercury-loaded dust, with the heat provided by the auxiliary flue gas stream (interchangeably referred to herein as 'auxiliary gas' or 'auxiliary flue gas' or 'auxiliary gas stream') or that provided by the main flue gas stream, the auxiliary flue gas stream is dedusted in a first auxiliary flue gas dedusting step of the procedure. The temperature of the auxiliary flue gas stream at the dedusting step should be preferably selected to be at least equal or preferably higher than the boiling temperature of mercury (or the respective mercury compounds) to prevent condensation of mercury on the dust. In a related embodiment, however, the temperature of the bypass gas can be chosen to be even below the boiling point, as elementary mercury has a significant vapor pressure even at temperatures below its boiling point. In the latter case, a part of the mercury will be removed with the dust (which is possible, but not necessarily intended). In practice, the purpose and goal of such temperature-setting is to obtain at least essentially mercury-free dust (and/or matter). (The term "essentially mercury-free", as used in conjunction with a specific material or matter that has undergone a mercury-removal procedure, is defined to include not only the substantially zero concentration of mercury but also the concentration of mercury, present in such matter that is lower than the concentration of mercury is such matter before the mercury-removal procedure.) The mercury free dust may be provided to the kiln configured for converting it into clinker, for example via the preheater. The term mercury free dust should thus be understood as dust with a (significantly) reduced mercury content compared to the mercury content prior to heating the mercury-loaded dust. The term 'mercury-free dust' should thus be understood as dust with a preferably significantly reduced mercury content compared to the mercury content that existed in the mercury-loaded dust prior to heating the mercury-loaded dust. Significantly reduced content of mercury includes content that is less than 75%, preferably less than 50%, even more preferably less than 25% and most preferably less than 10% of the initial mercury content present prior to the mercury removal step of the procedure.

The mercury is thus still in the auxiliary flue gas stream and is bound to an adsorbent. To this end, the auxiliary gas stream is cooled down to a temperature preferably well below the boiling temperature of mercury, e.g. 70 to 150° C. after the first dedusting step. Cooling may be carried out with the use of a heat exchanger system, such as for example a steam boiler, to enable the use of the heat (transported by the auxiliary flue gas stream) as process heat. In addition (in one implementation—after or prior such cooling step of the auxiliary gas stream), an adsorbent may be injected into the auxiliary flue gas stream. The mercury and other heavy metals attach to the adsorbent and can be removed from the auxiliary gas stream with the adsorbent by simply filtering or other dedusting techniques. More generally, the auxiliary gas stream is dedusted (again) with the use of adsorbent removal system, configured to remove the mercury-loaded adsorbent from the auxiliary gas stream. The adsorbent may include (or, in some embodiment, consist of) activated charcoal particles. Other particles can be used alternatively or in addition, for example clinker dust and/or raw meal as initially injected into the auxiliary flue gas stream. At least a fraction of the removed mercury-loaded adsorbent is preferably removed from the process and replaced with the fresh adsorbent. Another fraction of the removed adsorbent can be reinjected to the preferably cooled auxiliary gas stream upstream of the adsorbent removal system, i.e. it is recirculated and, preferably, only a fraction of it is replaced with the fresh adsorbent.

The above outlined scheme/methodology is structure to essentially remove the mercury (and other heavy metals), which is (are) added to the process by the mining products and the fuel from the process and thus to keep mercury emissions via the exhaust low.

Preferably, the auxiliary gas is subjected to a denitrification (that is, is denitrified) prior to the second cooling step. For example, a reductant may be injected into the system prior to the first auxiliary gas dedusting step and the dedusting system may include (or, in some embodiments, consists of) a filter comprising a catalyst configured for denitrification of the gas, i.e. for converting nitrogen oxides to harmless substances such as diatomic nitrogen and water. Such filters may comprise ceramic filter elements, into which at least one catalyst is embedded or incorporated. In other words, the filter includes at least one catalytic substance such as titanium oxide, oxides of base metals (such as vanadium, molybdenum and tungsten), zeolites and/or precious metals. These catalysts not only reduce the nitrogen oxides, but as well convert elementary mercury (Hg) to a higher oxidation state, e.g. to $Hg^{+2}$. This oxidized mercury forms compounds (such as, for example, mercury chloride or mercury bromide) that attach better to the adsorbent due to their lower boiling point and the lower vapor pressure at temperature(s) below their respective boiling points. Subsequent mercury removal is, therefore, enhanced by the catalyst. In addition, the catalyst removes dioxins and other volatile organic substances that could and would also attach to the adsorbent (at least if the adsorbent is activated charcoal). Thus, the active surface of the adsorbent is not reduced by organic substances. A similar effect can be achieved if the selective catalytic reduction (SCR) process and dedusting process are separated, for example if the auxiliary flue gas can be dedusted (for example, with the use of an electrostatic precipitator) and subsequently provided to a catalyst configured to denitrify the gas. The reductant is injected to auxiliary flue gas stream at a location upstream from the catalyst.

At least a fraction of the mercury-loaded dust may be added to a flow of transport gas, conveying the mercury-loaded dust to the respective flue gas stream to which it is injected. By mixing the transport gas with the main flue gas stream and/or the auxiliary flue gas stream (in one or more mixing chambers), the mercury-loaded dust may be injected into the respective flue gas flow.

Preferably, the transport gas is branched off from the main flue gas flow after the main flue gas has been cooled below the mercury boiling temperature, and preferably prior to having the main flue gas dedusted to obtain the mercury-loaded dust. At least a fraction of the mercury-loaded dust provided by the flue gas dedusting system may be added to the transport gas flow and mixed with the auxiliary gas as cooling gas, to thereby inject the mercury-loaded dust into the auxiliary gas and to vaporize the mercury. Thereby, no oxygen is added to the auxiliary flue gas stream and the transport gas is available at the place where the mercury-loaded dust is provided. Accordingly, the installation costs can be kept low. The dust is removed as explained above and can be added to the clinker, as it is essentially free of mercury.

Preferably, the dedusted auxiliary gas stream is delivered to a heat exchanger configured to heat a heat carrier fluid and, in turn, cooling the previously dedusted auxiliary gas stream down to a temperature below the boiling temperature of mercury. As a result, the mercury can be adsorbed effectively by the adsorbent and the thermal energy transported by the auxiliary gas stream can be recuperated and used as a process heat.

As explained above, a fraction of the removed adsorbent may be injected into the cooled auxiliary flue gas stream again, and another fraction of the removed adsorbent may be removed from the process. This operation facilitates the efficient use of the adsorbent and keeping low the amount of adsorbent to be deposited due to its mercury load.

As a skilled artisan will readily appreciate from the above discussion, the main flue gas stream is preferably cooled at a processing stage after the preheater and prior to having the main flue gas dedusted. There may be an additional dedusting step used (prior to cooling the main flue gas flow below the boiling point of mercury) to achieve a removal of a part of the dust prior to condensing the mercury on the remaining dust. Consequently, the amount of mercury-loaded dust is reduced and the mercury concentration in the mercury-loaded dust is enhanced. Thus, less (the smaller amount of) mercury-loaded dust remains to be handled. The additional dedusting step, if used, enhances a selective catalytic reduction of the main flue gas stream. This configuration is commonly referred to as 'low dust configuration'. In addition, the mercury is oxidized as explained above and attaches better to the remaining dust.

As used in this application, the terms 'upstream' and 'downstream' indicate and define particular positions with respect to (in relation to) the direction of the corresponding flow such as the flow of the flue gas, in one example, (i.e. relative to the bypass gas stream, or to the main flue gas stream, or to the auxiliary flu gas stream). The terms 'stream' and 'flow' are used interchangeably to indicate that the respective gases are transported in conduits connecting the respective components of the clinker line. 'Stream' and 'flow' have sometimes been omitted for simplicity in parts of this application, or in other words, the terms 'stream' and 'flow' have been added to the terms flue gas and bypass gas only, if it appeared particularly appropriate. The term vaporization of mercury means and defines a phase transition of metallic mercury or of mercury compounds (like $HgCL$, $HgCL_2$, $HgBr$, $HgBr_2$, ...) from a liquid or solid phase into a gas phase. The term 'mercury'—unless explicitly stated otherwise—refers to mercury no matter in which form (metallic, ionic, bound to a compound, ...). Condensation in turn is a phase transition from gas phase to a liquid or to a solid phase. Other heavy metals and their compounds exhibit essentially similar behavior and can be removed essentially in the same way, provided the respective boiling temperature is below temperature of the bypass gas. The term filter or filtering is used only to indicate that dust (or other solid) matter is removed from a gas stream. It is generally irrelevant which process is used to separate the dust from gas. Lots of different techniques have been suggested and can be employed as required. Bag filters for example are cheap but not suited for dedusting hot gases. Ceramic filters, electrostatic precipitators and cyclones can be uses as well at elevated temperatures.

As indicated above, mercury-loaded dust usually may y include other heavy metals like e.g. Thallium (Tl), Cadmium (Cd), lead (Pb), to name just a few (be it in elementary form or bound in compounds). Heavy metals in general can be removed from the clinker process using the same above-explained method. In practice, the mercury content of the flue gas and the clinker is measured as an indicator of the total heavy metal content of the flue gas and the clinker, respectively. Whether the respective heavy metals are separated from the heavy metal loaded dust or not is, essentially, a question of the temperature of the auxiliary flue gas stream. In principle, one could therefore generally replace the term and/or use of 'mercury-loaded dust' with 'heavy metal loaded dust'.

BRIEF DESCRIPTION OF THE DRAWINGS

In the following, the invention will be described by way of example, without limitation of the general inventive concept, on examples of embodiment and with reference to the drawings.

While the invention can be modified and assume alternative forms, specific embodiments are discussed below as but examples. The drawings and detailed description are not intended to limit the invention to the particular form disclosed, but to the contrary, the scope of the intention is to cover all modifications, equivalents and alternatives falling within the spirit the present invention as defined by the appended claims.

DETAILED DESCRIPTION

Figure 1:
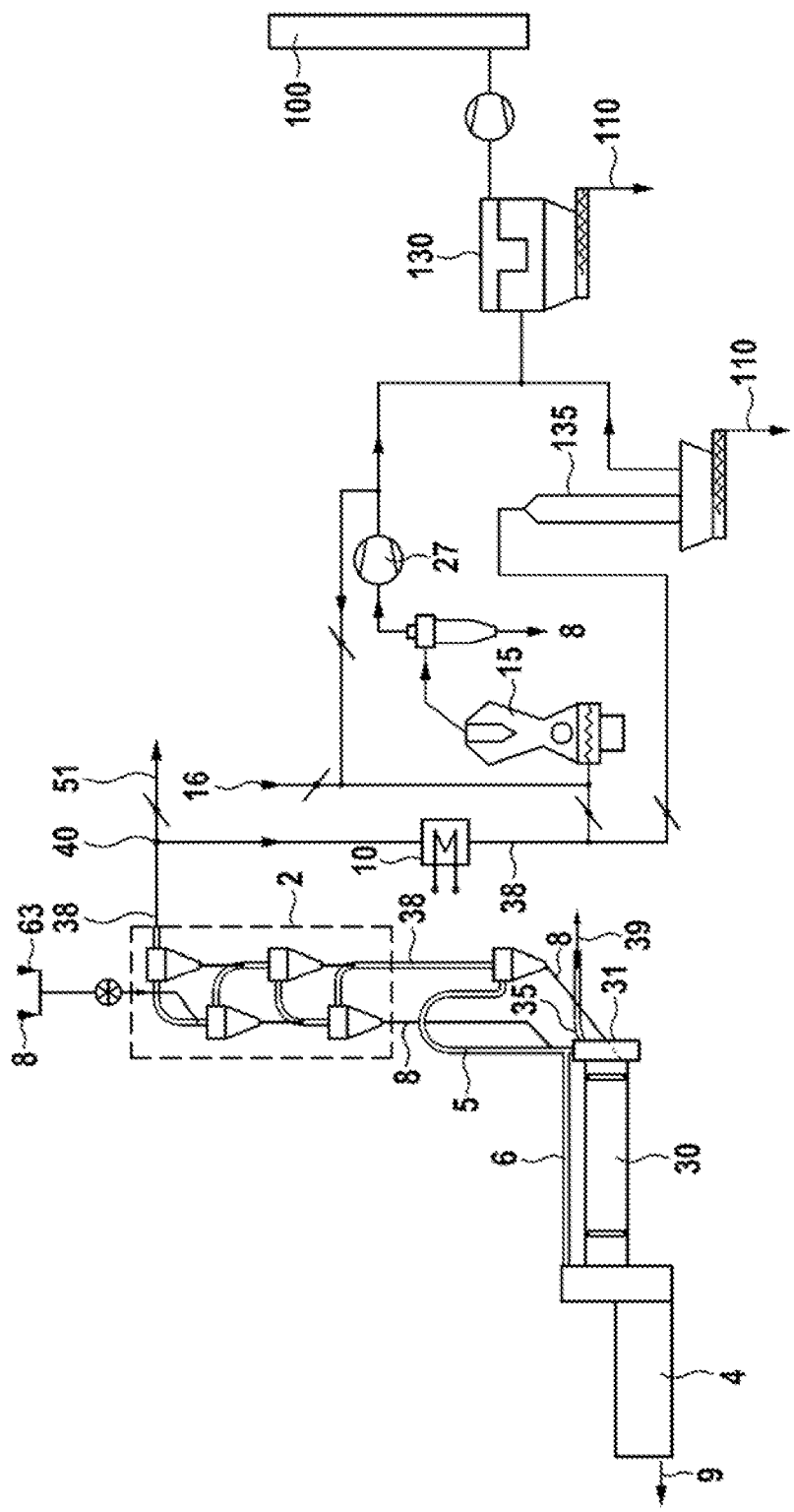
FIG. 1 shows a schematic sketch of a first cement clinker line.

The cement clinker line in FIG. 1 comprises as usual a preheater 2, a kiln 30 and a clinker cooler 4. Raw meal 8 is preheated in the preheater 2 and provided to the kiln inlet 31. In the kiln 30 the raw meal 8 is calcined and sintered to clinker. The clinker 9 is discharged on the clinker cooler 4 and can be further processed after being cooled down (indicated by an arrow, symbolizing the clinker 9), e.g. by milling. Hot air from the clinker cooler 4 is provided to the kiln 30 as secondary air and leaves the kiln 30 at its inlet 31 as flue or exhaust gas. Said kiln exhaust gas is dust loaded and hot (typically 1500° C. to 2000° C.). The main amount of the kiln exhaust gas (briefly 'main flue gas stream') is provided to the preheater 2 configured for pre-warming the raw meal 8. Optionally, a calciner 5 may be installed between the preheater 2 and the kiln 30. In that case the raw meal 8 is provided from the preheater 2 to the calciner 5 and from the calciner 5 to the kiln 30. At least a part of the kiln exhaust gas may be provided to the preheater via the calciner 5. Further, tertiary air may be provided from the clinker cooler 4 to the calciner 5.

A main fraction of the flue gas 38 exiting the preheater 2 is cooled down as indicated by a heat exchanger 10, representing simply some cooling system. The heat exchanger 10 enables to recuperate thermal energy when cooling the flue gas 38 and to use the thermal energy as process heat. But other cooling techniques like water cooling and the like may as well be used. Downstream of the cooling system, the main flue gas stream is next dedusted as indicated by dedusting system 130, 135 or used to pre-warm raw meal being produced in a raw-meal mill 15. The raw meal 8 provided by the raw-meal mill 15 is provided to the preheater 2. The raw-meal mill 15 can as well be heated by bypass gas 39 (after being processed to remove chlorides and the like) or other warm gases, as indicated by warm gas inlet 16.

Regardless whether the main flue gas stream 38 is used to heat the raw-meal mill 15 or if it bypasses the raw-meal mill 15, in any case it is dedusted at least by one of the dedusting system 130, 135, while having a temperature below the boiling point of mercury. The dust 110 being removed by said dedusting system, e.g. bag filters, comprises mercury as due to the cooling step indicated by reference numeral 10, the mercury is absorbed by the dust. At least a fraction of the mercury-loaded dust 110 is entered to the preheater as indicated by arrow head 8, i.e. the corresponding fraction of the mercury is reintroduced as raw meal 8 into the preheater 2.

Figure 2:
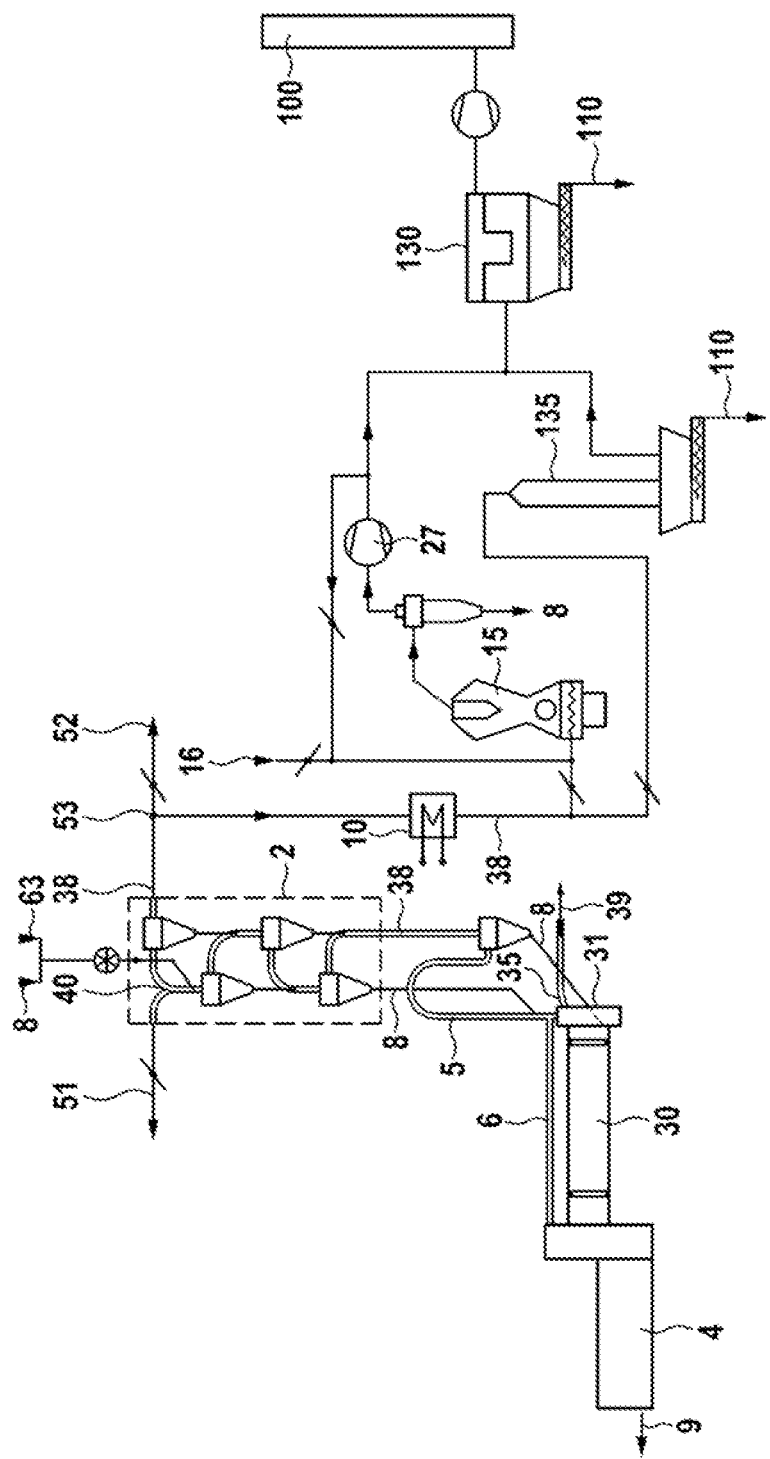
FIG. 2 shows a schematic sketch of a second cement clinker line.

The cement clinker line in FIG. 2 is distinguishes from the cement clinker line of FIG. 1 only in the position of the branch off for the auxiliary flue gas stream 51. According to FIG. 1, an auxiliary flue gas stream 51 is drawn off at an the auxiliary flue gas branch off 40 between the preheater 2 and the subsequent heat exchanger 10, whereas in FIG. 2, the corresponding branch off 40 configured for drawing off the auxiliary flue gas stream 51 is an intermediate exit of the preheater 2. In the example of FIG. 2, the intermediate exit is connected with the main flue gas duct upstream (with respect and in reference to the main flue gas flow) from the last cyclone (and downstream the corresponding upstream cyclone). But of course the number of cyclones and the position of the branch off 40 is only a preferred example and not intended to be limiting.

Figure 3:
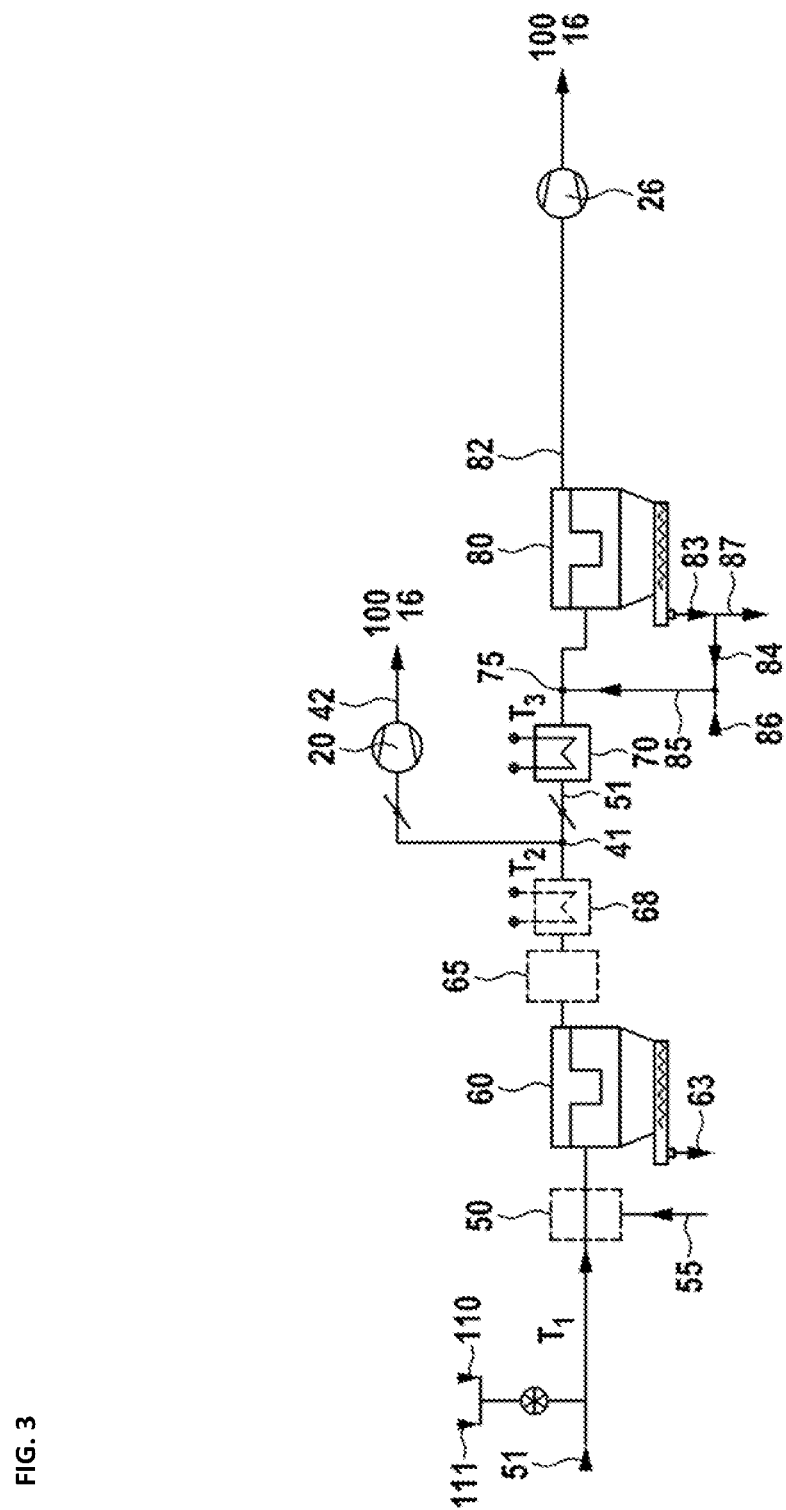
FIG. 3 shows a schematic flow diagram of an auxiliary flue gas stream.

The branch off 53 provides an emergency flue gas outlet 52, preferably being connected to an emergency chimney. As shown in FIG. 1, it could be omitted as well, at least it is not relevant in the context of this invention FIG. 3 shows an auxiliary flue gas branch of a cement clinker line. At least fraction, e.g. 1% to 30% or even more—if appropriate—of the kiln exhaust gas is drawn off as auxiliary flue gas stream 51 from the main flue gas stream downstream the preheater (2) (see FIG. 1) as indicated by branch off 40 (cf. FIG. 1) or by an intermediate outlet of the preheater 2, said intermediate outlet providing the as auxiliary flue gas stream 51 as shown in FIG. 2. From said branch off 40, the auxiliary flue gas stream 51 flows with a temperature of typically about 250° C. to 450° C. (possible are as well 200° C. to 700° C.) to the auxiliary flue gas branch. The auxiliary flue gas branch comprises a reductant injector 50 (as indicated by the dashed box 50) configured for injecting a reductant 55, like ammonia, ammonium or the like into the auxiliary flue gas stream 51. The dashed box indicates that the reductant injection is optional, but a preferred embodiment. The dust loaded, mercury containing auxiliary flue gas stream 51 is subsequently ducted to a hot gas filter 60 (as example for any suited dedusting system) to dedust the auxiliary flue gas stream (51) at a temperature T1 still above the boiling point of mercury. Thereby, the dust is removed and the gaseous mercury remains gaseous and thus in the auxiliary flue gas stream. As indicated above, the hot gas filter 60 may comprise at least one catalyst configured for reducing nitrogen oxides to diatomic nitrogen and water. Alternatively the catalyst may be a separate unit as indicated by the dashed box 65. Thus, the auxiliary flue gas stream 51 is dedusted and (preferably) denitrified using a selective catalytic reduction (SCR), but as the temperature T1 is still above the boiling temperature of the mercury, the mercury remains in the auxiliary flue gas stream 51. The catalyst changes the oxidation state of metallic mercury (Hg) to Hg+2 enhancing its subsequent absorption, as explained above. Next, the dedusted auxiliary flue gas stream 51 is cooled to a temperature T2, e.g. in the order of 150° C. to 200° C. by a heat exchanger 68 or any other cooling system 68. Again, the dashed box indicates that the cooling system 68 is optional, but a preferred embodiment. If the cooling system 68 is a heat exchanger as indicated the heat removed from the auxiliary flue gas stream can be used as process heat, e.g. for an organic rankine cycle, a (pre-) heating a steam boiler or any other suited process.

Downstream of the optional cooling system 68 is a further branch 41 configured for optionally branching of at least a part of the dedusted but still mercury containing auxiliary flue gas stream. This branched stream 42 may be provided the exhaust 100 or used as gas for drying raw meal as indicated by 16. The remaining part of the auxiliary flue gas stream 51 (briefly auxiliary flue gas stream 51) is cooled to a temperature T3 below the boiling temperature of mercury, preferably to about 70° C. to 120° C.

After cooling the auxiliary flue gas stream (51) gas to T3, an adsorbent 85 is injected into the auxiliary flue gas stream at 75 to adsorb the mercury and mercury compounds and preferably other heavy metals. Downstream of the injection, the adsorbent and thus the mercury is removed from the auxiliary flue gas using a filter 80, being an example for any suited dedusting system. The mercury-loaded adsorbent 83 can be recirculated at least in part (see arrow 84). A further part 87 of the mercury-loaded adsorbent is removed from the process and replaced by fresh adsorbent 86. The cleaned auxiliary flue gas stream leaving the filter 80 at 82 has a low dust concentration and a low mercury content. It can be used as process gas, e.g. for drying raw meal as indicated by 16. It can as well be released as indicated by 100 or used for cooling bypass gas 39.

The amount of mercury that is being removed from the process can be augmented, if mercury-loaded dust 110, 111 is added to the auxiliary flue gas stream upstream of the hot gas filter 60. The mercury-loaded dust can be provided from at least one of the dedusting system 130, 135. The auxiliary flue gas branch (branch channel or passage or duct) in addition enables to remove mercury from waste products 111 of other processes. 'Other processes' means here any process which is not a sub-process of cement clinker manufacturing, e.g. the waste product can be waste material from landfill. For example, mercury containing slag could be treated using the auxiliary flue gas branch (or branch channel or passage), to thereby separate the mercury and reduce the amount of mercury contaminated waste to be deposited. Depending on the composition of the waste product 111 and the amount to be treated, the mercury free dust 63 (or more generally mercury free matter 63) can be provided together with the raw meal to the preheater. Alternatively, the mercury free dust 63 can used as additive to the clinker.

It will be appreciated to those skilled in the art having the benefit of this disclosure that this invention is believed to provide a method for manufacturing clinker and a cement clinker manufacturing line. Further modifications and alternative embodiments of the invention will be recognized by those skilled in the art in view of this description. Accordingly, this description is to be construed as illustrative only and is for the purpose of teaching those skilled in the art the general manner of carrying out the invention. Described elements and materials may be appropriately substituted, parts and processes may be reversed, and certain features of the invention may be utilized independently, as would appreciated by one skilled in the art after having the benefit of this description of the invention. Changes may be made in the elements de-scribed herein without departing from the spirit and scope of the invention as described in the following claims.

LIST OF REFERENCE NUMERALS 2 preheater
4 clinker cooler
5 calciner
6 tertiary air duct
8 raw meal
9 clinker
10 cooling means or system/heat exchanger (optional)
15 raw-meal mill
16 warm gas inlet
20 ventilation system
26 ventilation system
27 ventilation system
30 kiln
31 kiln inlet (raw meal inlet and flue gas outlet/flue gas exhaust)
35 chloride bypass intake
38 main flue gas stream
39 chloride bypass gas
40 branch (channel, passage) off (first)
41 branch (channel, passage) off (second, optional)
42 branched fraction of auxiliary flue gas stream
50 reductant injector (optional)
51 auxiliary flue gas stream
52 emergency outlet (optional, can be connected to an emergency chimney)
53 emergency branch off (optional)
55 reductant
60 dust removal means
63 (essentially) mercury free dust/matter
65 catalyst unit (optional)
68 cooling system (optional), e.g. heat exchanger
70 cooling system, e.g. heat exchanger
75 adsorbent injecting system
80 dedusting system/adsorbent removal system
82 dedusted mercury free auxiliary flue
83 mercury-loaded adsorbent
84 recirculated adsorbent
85 adsorbent
86 fresh adsorbent
87 removed adsorbent
100 exhaust
110 mercury-loaded dust
111 mercury-loaded waste product
130 dedusting system
135 dedusting system

The invention claimed is:

1. A method for manufacturing clinker, the method comprising:
sintering raw meal in a kiln to clinker,
preheating raw meal in a preheater using a main flue gas stream from the kiln as a heat source,
dedusting the main flue gas stream downstream from the preheater at a temperature below the boiling point of mercury to produce mercury-loaded dust,
branching off an auxiliary flue gas stream from the main flue gas stream at an auxiliary flue gas stream branch prior to cooling the main flue gas stream to the temperature below the boiling point of mercury, wherein said branching is carried out either at a location downstream from the preheater or at an intermediate gas exit of the preheater,
dedusting the auxiliary flue gas stream to obtain at least essentially mercury-free dust and dedusted auxiliary flue gas stream,
binding mercury of the auxiliary flue gas stream to an adsorbent, wherein the binding comprises injecting the adsorbent into the dedusted auxiliary flue gas stream and cooling the auxiliary flue gas stream, and
removing the adsorbent from the dedusted auxiliary flue gas stream to form removed adsorbent and further processing the dedusted auxiliary flue gas stream.

2. The method of claim 1, further comprising vaporizing mercury by injecting at least one of (i) a fraction of the mercury-loaded dust and (ii) a mercury-loaded waste product into at least one of the auxiliary flue gas stream and the main flue gas stream at a location that is upstream from the auxiliary flue gas stream branch, the auxiliary flue gas stream branch being configured to draw off said auxiliary flue gas stream from the main flue gas stream.

3. The method of claim 1, further comprising providing the mercury free dust to the kiln to obtain clinker.

4. The method of claim 1, comprising delivering the dedusted auxiliary flue gas stream to a heat exchanger that is configured to heating a heat carrier fluid, and wherein said binding includes cooling down the dedusted auxiliary flue gas stream.

5. The method of claim 1, wherein the binding step comprises cooling the auxiliary flue gas stream and subsequently injecting the absorbent into the auxiliary flue gas stream.

6. The method of claim 1, further comprising injecting a first fraction of the removed adsorbent into the dedusted auxiliary flue gas stream and removing a second fraction of the removed adsorbent from a process of said manufacturing.

7. The method of claim 1, comprising injecting a reductant to the auxiliary flue gas stream and delivering the auxiliary flue gas stream to a catalyst that is configured to denitrify the auxiliary flue gas stream upstream from a location at which said binding occurs.

8. The method of claim 7, wherein the dedusting the auxiliary flue gas stream comprises filtering at least a fraction of the auxiliary flue gas stream with the use of a catalytic hot gas filter to oxidize mercury atoms in the auxiliary flue gas stream and to convert nitrogen oxides ($NO_x$) to nitrogen ($N_2$).

9. The method of claim 1, comprising cooling the main flue gas stream at a location downstream from the preheater and prior to said dedusting the main flue gas stream.

10. A cement clinker line configured for manufacturing clinker according to claim 1, the clinker line comprising:
- a kiln configured to sinter raw meal to clinker, the kiln having a main exhaust configured to draw a main flue gas stream,
- a preheater operably connected to the kiln, the preheater configured to receive the main flue gas stream from the main exhaust and to preheat the raw meal using the main flue gas stream from the kiln as a heat source,
- a first dedusting system configured to dedust the main flue gas stream at a location downstream from the preheater at a temperature below the boiling point of mercury to obtain mercury-loaded dust,
- a branch channel configured to draw off an auxiliary flue gas stream, having a temperature above the boiling point of mercury, from the main flue gas stream, said branch channel being downstream from the preheater or being an intermediate gas exit of the preheater,
- a second dedusting system downstream from the branch channel, the second dedusting system configured to dedust the auxiliary flue gas stream at a temperature above the boiling point of mercury to obtains an essentially mercury-free dust and a dedusted auxiliary flue gas stream,
- a cooling system downstream from the second dedusting system, the cooling system configured to cool the dedusted auxiliary flue gas stream,
- an adsorbent injecting system downstream from the second dedusting system, said adsorbent injecting system configured to inject an adsorbent into the dedusted auxiliary flue gas stream to bind mercury of the dedusted auxiliary flue gas stream to the adsorbent, and
- an adsorbent removal system located downstream from the adsorbent injecting system and downstream from the cooling system, the adsorbent removal system being configured to remove the adsorbent from the dedusted auxiliary flue gas stream to form removed adsorbent and to relay the dedusted auxiliary flue gas stream for further processing.

11. The cement clinker line of claim 10, further comprising at least a conveying system and a dust injecting system, the conveying system configured to carry at least a fraction of the mercury-loaded dust, that is separated by the first dedusting system, to the dust injecting system, the dust injecting system configured to inject, at a location upstream from the branch channel, at least a part of the at least said fraction of the mercury-loaded dust into the auxiliary flue gas stream to vaporize at least a portion of mercury contained in said fraction of the mercury-loaded dust in the auxiliary flue gas stream.

12. The cement clinker line of claim 10, further comprising a conveying system and a dust injecting system, the conveying system configured for carry a mercury-loaded waste product to the dust injecting system, the dust injecting system configured to inject, at a location upstream from the branch channel, at least a fraction of the mercury-loaded waste product into at least one of the auxiliary flue gas stream and the main flue gas stream, to vaporize at least a part of mercury contained in said fraction of the waste product in the auxiliary flue gas stream.

13. The cement clinker line of claim 10, further comprising a feeding system configured to feed at least a fraction of the removed adsorbent to an adsorbent input of the adsorbent injecting system.

14. The cement clinker line of claim 10, further comprising at least a connecting device configured to feed the mercury-free dust to the kiln.

15. The cement clinker line of claim 10, further comprising a) a catalyst that is either at a location downstream from the first dedusting system or is incorporated in the first dedusting system and b) reductant injecting system configured to inject, into the bypass flue gas, a reductant at a location upstream from the catalyst, wherein the catalyst is configured to denitrify the bypass flue gas.

16. The cement clinker line of one claim 10, wherein the cooling system comprises a heat exchanger configured to transfer heat from the auxiliary flue gas stream to a heat carrier fluid.

* * * * *